US008856783B2

(12) United States Patent
Sharp et al.

(10) Patent No.: US 8,856,783 B2
(45) Date of Patent: Oct. 7, 2014

(54) ALLOCATING VIRTUAL MACHINES ACCORDING TO USER-SPECIFIC VIRTUAL MACHINE METRICS

(75) Inventors: Richard Sharp, Cambridge (GB); David Scott, Cambridge (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 581 days.

(21) Appl. No.: 12/902,542

(22) Filed: Oct. 12, 2010

(65) Prior Publication Data

US 2012/0089980 A1   Apr. 12, 2012

(51) Int. Cl.
*G06F 9/455* (2006.01)
*G06F 11/34* (2006.01)

(52) U.S. Cl.
CPC .. *G06F 9/45558* (2013.01); *G06F 2009/45591* (2013.01); *G06F 11/3495* (2013.01); *G06F 2201/865* (2013.01); *G06F 11/3438* (2013.01); *G06F 2009/45562* (2013.01); *G06F 2201/815* (2013.01)
USPC .............................................. 718/1; 718/104

(58) Field of Classification Search
CPC ............ G06F 11/3495; G06F 11/3438; G06F 9/45558; G06F 2009/45591; G06F 2009/45562; G06F 2201/815; G06F 2201/865
USPC ...................................................... 718/1, 104
See application file for complete search history.

(56) References Cited

U.S. PATENT DOCUMENTS

| 7,299,468 | B2 * | 11/2007 | Casey et al. | 718/104 |
|---|---|---|---|---|
| 2007/0180087 | A1 * | 8/2007 | Mizote et al. | 709/223 |
| 2010/0146506 | A1 * | 6/2010 | Lee et al. | 718/1 |
| 2010/0199285 | A1 * | 8/2010 | Medovich | 718/104 |
| 2011/0083131 | A1 * | 4/2011 | Pirzada et al. | 718/1 |
| 2012/0167083 | A1 * | 6/2012 | Suit | 718/1 |
| 2014/0082165 | A1 * | 3/2014 | Marr et al. | 709/222 |

OTHER PUBLICATIONS

Extended European Search Report on 11160072.2 dated Jan. 4, 2012.
Krsul I et al: "VMPlants: Providing and Managing Virtual Machine Execution Environments for Grid Computing", Supercomputing, 2004. Proceedings of the ACM/IEEE SC2004 Conference Pittsburgh, PA, USA Nov. 6-12, 2004, Piscataway, NJ, USA,IEEE, Nov. 6, 2004, pp. 7-7, XP010780332, DOI: 10.1109/SC.2004.67 ISBN: 978-0-7695-2153-4 * the whole document*.

(Continued)

*Primary Examiner* — Emerson Puente
*Assistant Examiner* — Willy W Huaracha
(74) *Attorney, Agent, or Firm* — Foley and Lardner LLP; John D. Lanza

(57) ABSTRACT

The performance monitoring system allocates virtual machines to users or user sessions according to a user categorization that is determine using user session information and virtual machine metrics. A session monitor of the performance monitoring system is notified that a user session terminated, where the user session accessed a virtual machine. The session monitor responsively records the user session information and obtains virtual machine metrics for the virtual machine from a virtual machine performance monitor. The performance monitoring system updates a user workload profile using the user session information and the virtual machine metrics, and categorizes the user of the user session according to the user workload profile. Upon receiving a request from a user for a virtual machine, a virtual desktop infrastructure requests a virtual machine from a virtual machine manager. The virtual machine manager responsively allocates a virtual machine to the user according to the user's categorization.

22 Claims, 10 Drawing Sheets

(56) References Cited

OTHER PUBLICATIONS

Xuanhua Shi et al: "VNIX: Managing Virtual Machines on Clusters", Frontier of Computer Science and Technology, 2008. FCST '08. Japan-China Joint Workshop on, IEEE, Piscataway, NJ, USA, Dec. 27, 2008, pp. 155-162, XP031399405, ISBN: 978-1-4244-3418-3 * abstract * * p. 155, left-hand column, line 1 right-hand column, paragraph II. * * p. 156, left-hand column, paragraph III.-p. 162, last line *.

* cited by examiner

ALLOCATING VIRTUAL MACHINES ACCORDING TO USER-SPECIFIC VIRTUAL MACHINE METRICS

FIELD OF THE DISCLOSURE

This application generally relates to allocating virtual machines to users. In particular, this application relates to allocating virtual machines based on virtual machine metrics allocated to a particular user.

BACKGROUND OF THE DISCLOSURE

In many systems, performance metrics associated with a virtualization system can be stored or associated with one or more virtual machines. When a user initiates one of these virtual machines, a determination is made about where to execute the virtual machine. In many instances, this determination is made based in part on the performance metrics stored or associated with the virtual machine. Thus, in this example and in many other systems, a virtualization system determines where to execute a virtual machine based in part on performance metrics associated with the virtual machine.

The decision about where to execute a virtual machine is sometimes based on the performance of that virtual machine. These performance metrics can include processor utilization, memory utilization, a value representative of average utilization of computing resources, bandwidth utilization, etc. In many instances, these metrics are the result of not only virtual machine performance, but also user behavior. When selecting a machine to execute the virtual machine, an assumption may be made that these performance metrics are indicative of the load the virtual machine will place on the machine selected to execute the virtual machine. In a pooled virtual desktop infrastructure (VDI) environment, users may be allocated virtual machines from a pool or group of virtual machines. Therefore the load placed on the machine executing the virtual machine is a result of both the actions taken by a user while logged into the virtual machine, and the virtual machine. What is needed is a system that not only takes into account the utilization metrics of a virtual machine, but more specifically which user was logged into the virtual machine when the utilization metrics were recorded. The utilization metrics recorded against the particular user can be used to determine an amount of load a user may likely impose on a virtual machine. A virtual machine can be allocated to the user based on the likely amount of load the may place on the virtual machine.

SUMMARY OF THE DISCLOSURE

In one aspect, described herein are methods and systems for determining where to execute a virtual machine or how to configure a virtual machine based on metrics associated with a user and the virtual machine assigned to the user. In many virtualization systems, determinations about where to execute a virtual machine and how to configure that virtual machine are based in part on historical performance metrics associated with the virtual machine. In an environment where virtual machines are allocated to users from a pool or group of virtual machines, the workload placed on a physical computing machine by the virtual machine is likely the result of not only the virtual machine but also the user accessing the virtual machine. The methods and systems described herein address this problem by selecting an execution environment for a virtual machine and configuring that virtual machine based on historical performance metrics of a user and the virtual machine assigned to that user.

In another aspect, described herein are methods and systems for allocating a virtual machine to a user according to a user categorization, where the user categorization is determined according to historical first user session information and virtual machine metrics. A session monitor executing on a computing machine receives a notification that a first user session terminated, wherein the first user session accessed a first virtual machine. In response to termination of the first user session, the session monitor records first user session information. The virtual machine metrics for the first virtual machine are then obtained from a virtual machine performance monitor. A performance monitor then updates a first user workload profile using the first user session information and the first virtual machine metrics. The first user workload profile corresponds to a first user of the first user session. The first user is then categorized according to the first user workload profile. A virtual desktop infrastructure can then receive a request from the first user for a virtual machine. In response to receiving this request, the first user is allocated a virtual machine according to the first user's categorization.

In some embodiments, the session monitor executes outside of a virtual desktop infrastructure.

In other embodiments, the first user can be categorized as a heavy user, a medium user or a light user according to the first user workload profile.

The performance monitor, in some embodiments, can map the recorded first user session information onto the obtained first virtual machine metrics.

In other embodiments, the first user categorization can be stored in a storage repository.

In one embodiment, a categorization module executing on the computing machine outside of a virtual desktop infrastructure can carry out categorizing the first user.

In other embodiments, the session monitor can receive a notification that a second user session terminated, where the second user session accessed a second virtual machine. The session monitor can then record the second user session information, and the virtual machine metrics for the second virtual machine can be obtained. The performance monitor can then update a second user workload profile using the second user session information and the second virtual machine metrics. The second user workload profile can correspond to a second user of the second user session. In some embodiments, a categorization module can use the second user workload profile to categorize the second user according to the second user workload profile.

In some embodiments, the virtual desktop infrastructure can respond to the first user's request for a virtual machine by requesting a virtual machine from a virtual machine manager. The virtual machine manager, in response to the request issued by the virtual desktop infrastructure, can allocate a virtual machine to the first user according to the first user's categorization. Allocating the virtual machine, in some embodiments, can include configuring a virtual machine according to the first user categorization. In other embodiments, allocating the virtual machine can include selecting a virtual machine according to the first user categorization.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
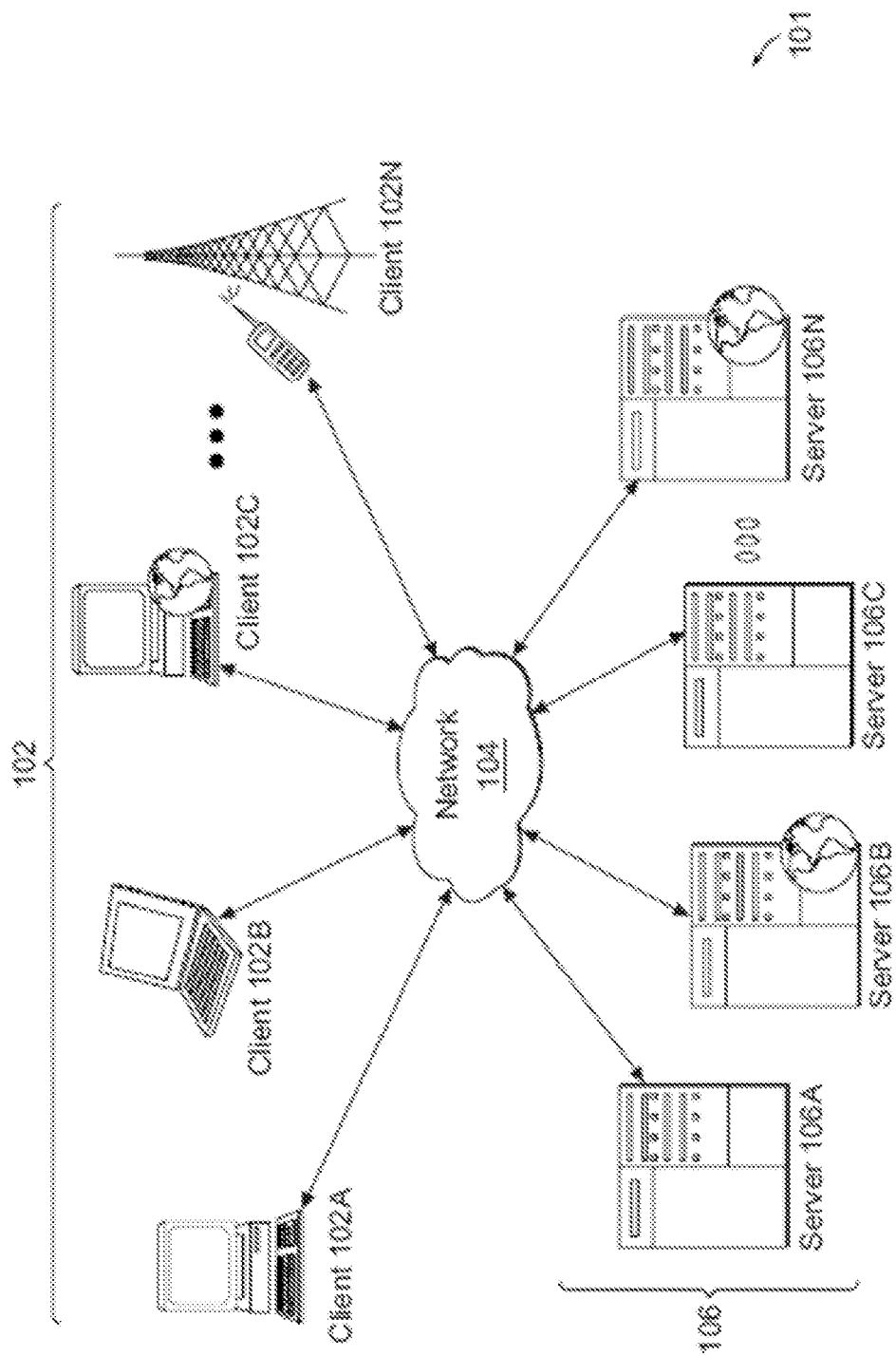
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
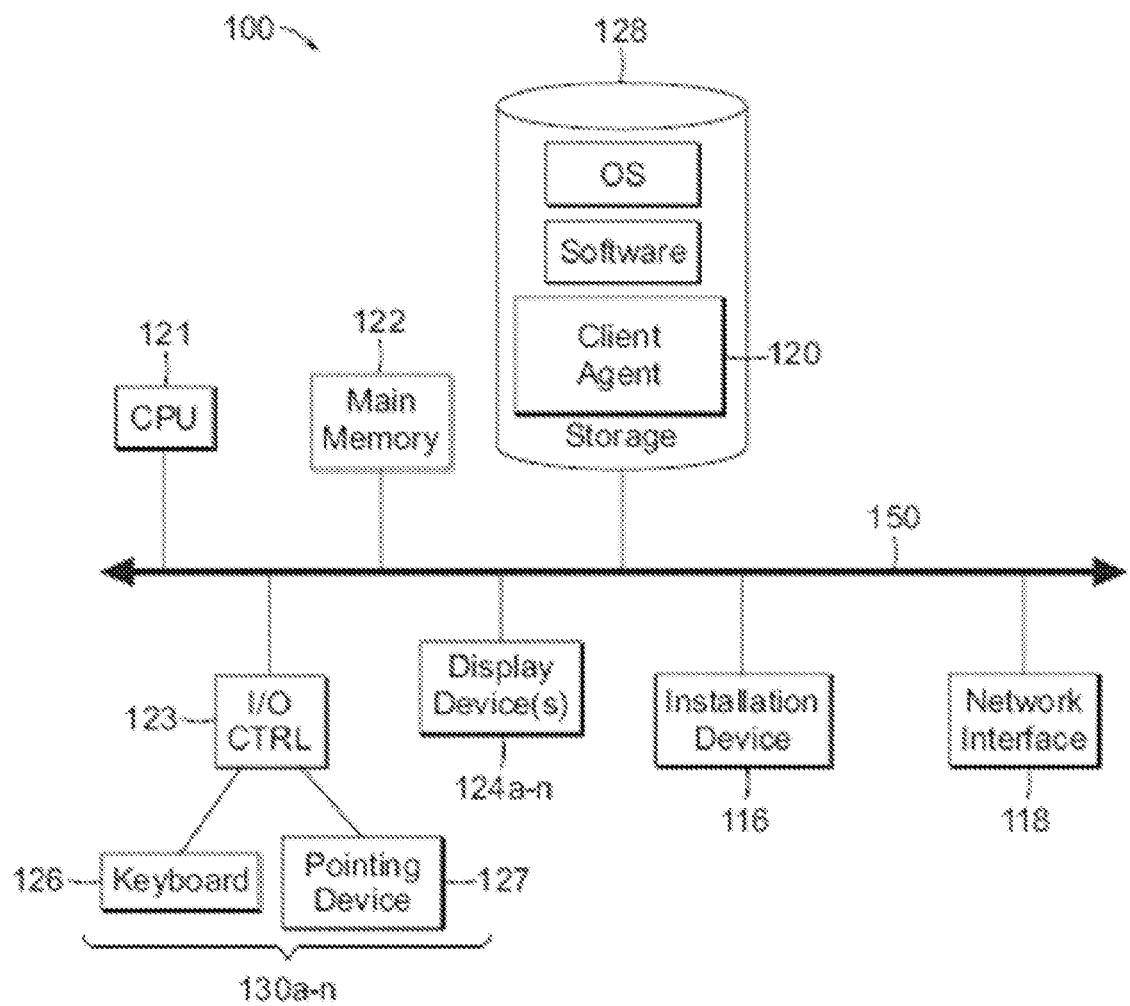
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
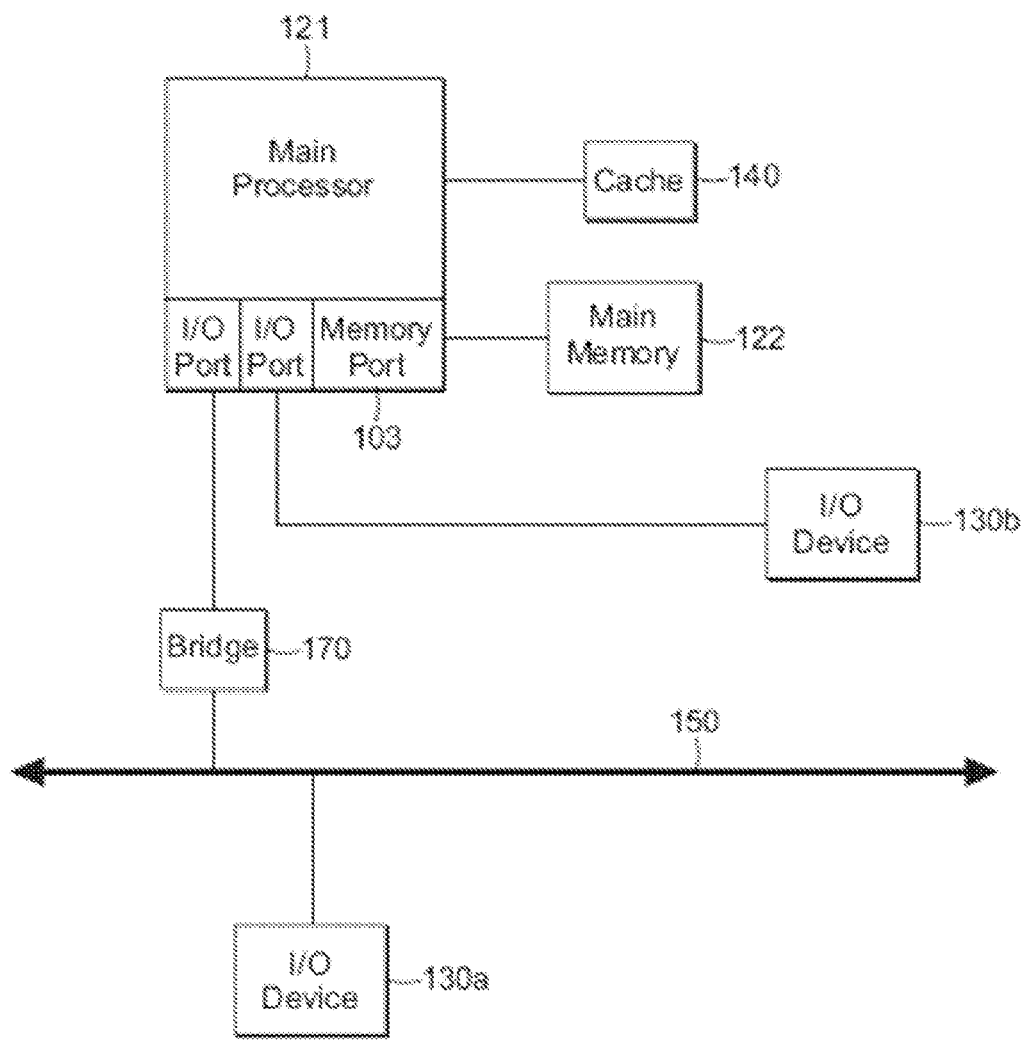

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2A:
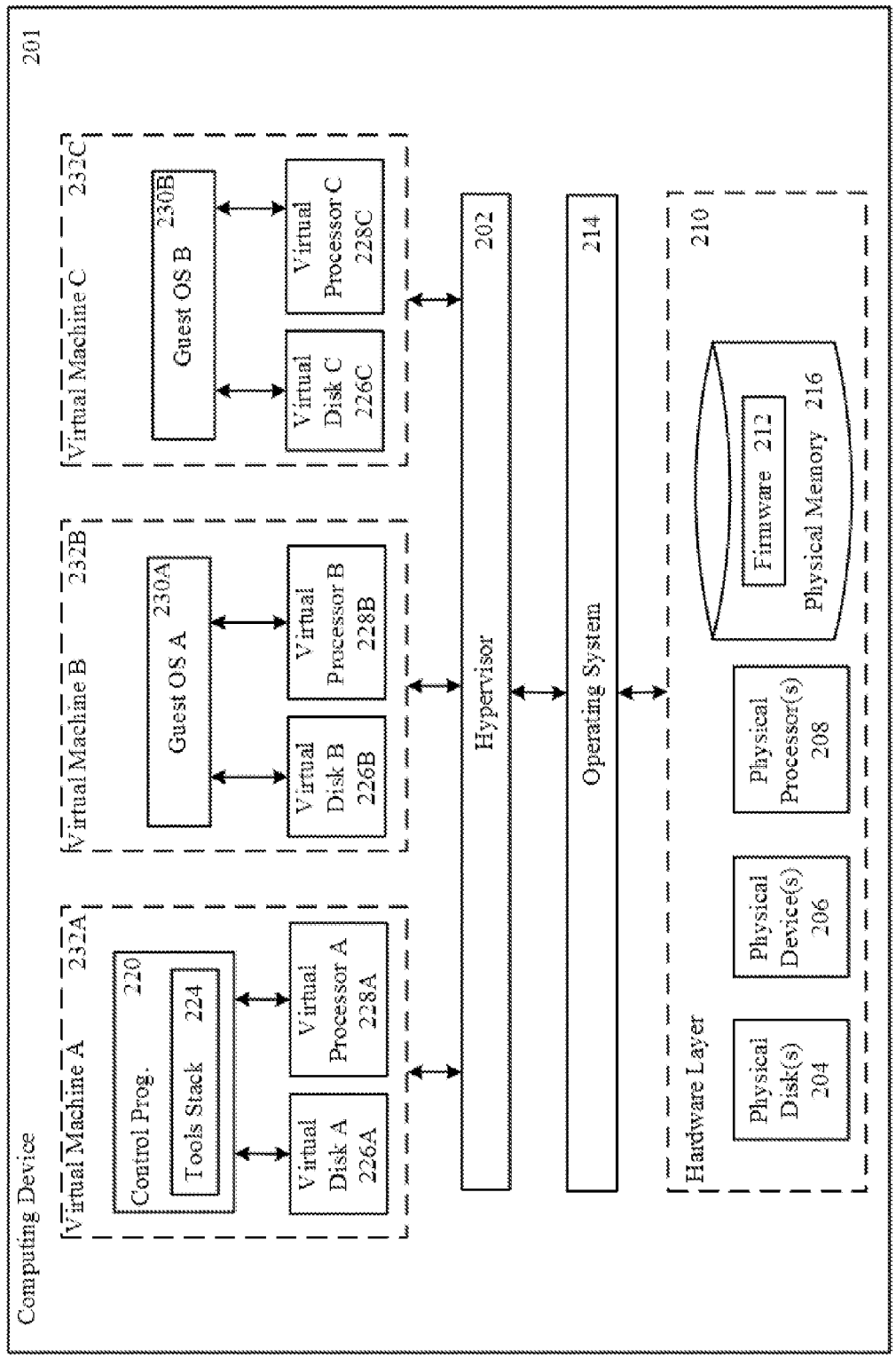
FIG. 2A and FIG. 2B are block diagrams that depict embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B.

Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
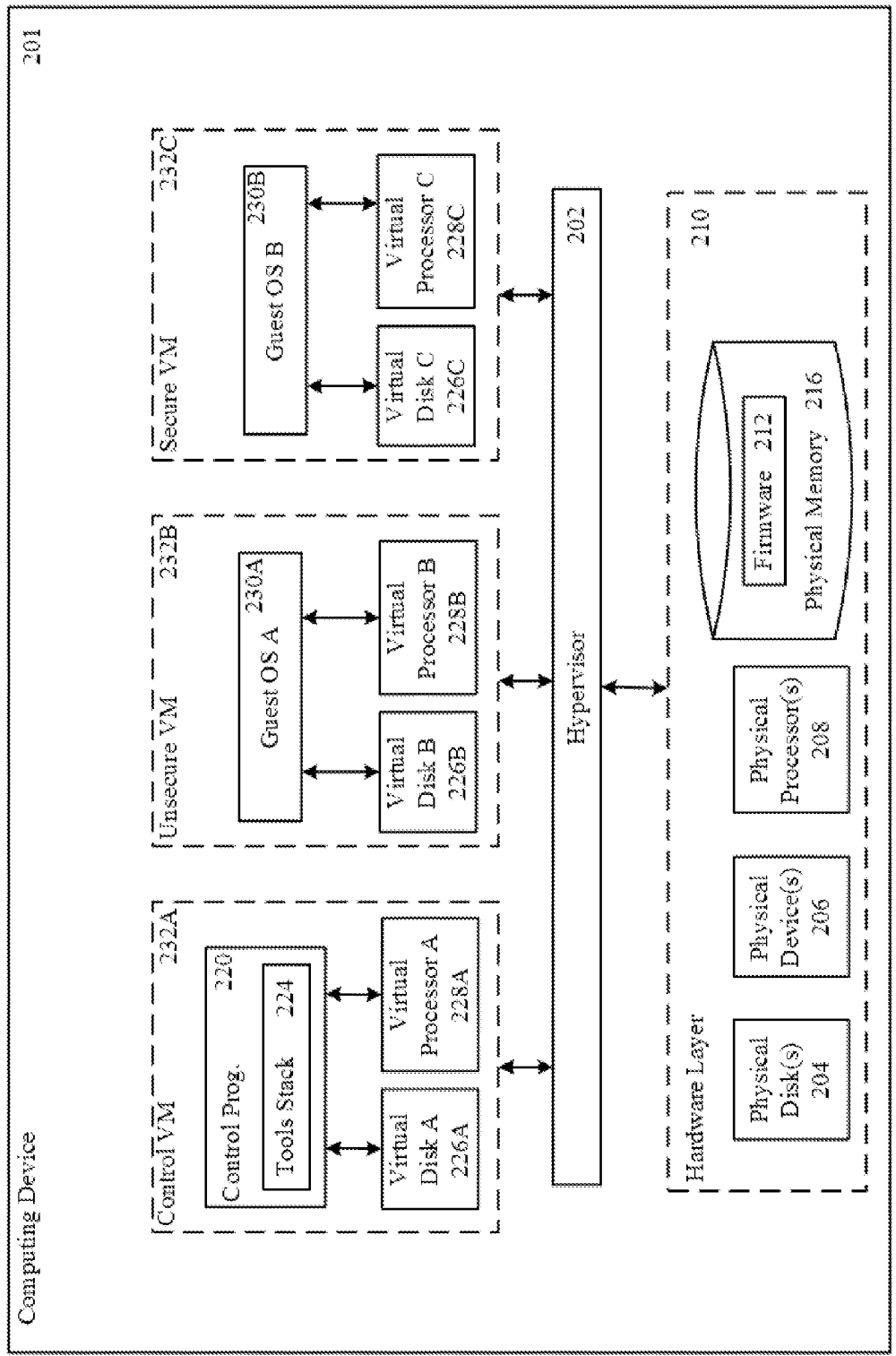

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Figure 3:
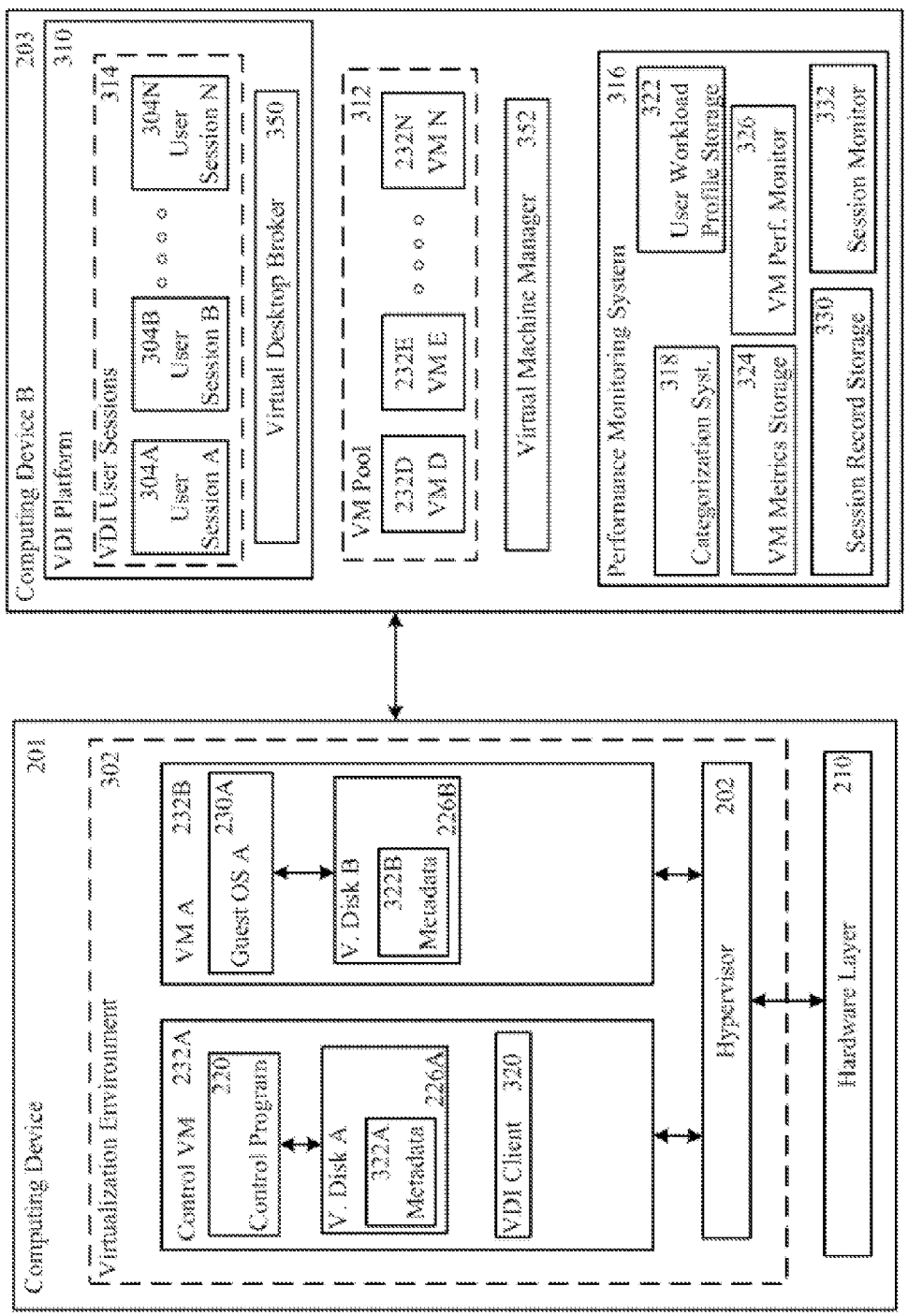
FIG. 3 is a block diagram that depicts embodiments of a virtualization environment and a virtual desktop infrastructure environment.

Illustrated in FIG. 3 is one embodiment of a system that can include a computing device 201 executing a virtualization environment 302 and a computing device 203 that executes a virtual desktop infrastructure (VDI) platform 310 and a performance monitoring system 316. The virtualization environment 302 executing on the computing device 201, can be any virtualization environment described herein. The illustrated embodiment depicts a virtualization environment 302 that includes a hypervisor 202, a control virtual machine 232A and one or more additional virtual machines 232B. The control virtual machine 232A can include a control program 220 communicating with a virtual disk 226A that includes metadata 322A, and the control virtual machine 232A can execute a VDI client 320. The additional virtual machine(s) 232B can execute a guest operating system 230A which communicates with a virtual disk 226B that can include metadata 322B. The computing device 201 can include a hardware layer 201 that interfaces with the hypervisor 202. The other computing device 203 can include a VDI platform 310 that can encompass a group of VDI user sessions 314 that includes one or more user sessions 304A-N (herein generally referred to a user sessions 304) and a virtual desktop broker 350. In some embodiments, the computing device 203 can also execute a virtual machine manager 352 that can access a virtual machine pool 312 of one or more virtual machines 232A-N (herein generally referred to as virtual machine 232.) The other computing device 203 can also execute a performance monitoring system 316 that can include a categorization system 318, a user workload profile storage repository 322, a virtual machine metrics storage repository 324, a virtual machine performance monitor 326, a session record storage repository 330 and a session monitor 332.

Further referring to FIG. 3, and in more detail, in one embodiment the computing device 201 and the other computing device 203 can be any computing device 100 described herein. In some embodiments, the computing devices 201, 203 can be a server 106, a client 102 or another type of computing machine or mobile device. The computing devices 201, 203 can be referred to as a first computer, a second computer, a third computer, etc. Furthermore, the computing devices 201, 203 can communicate with one another over a network such as any network 104 described herein. As the computing devices 201, 203 can be any computing machine 100 described herein, so too the hardware layer 210 can be any hardware layer 210 described herein and can include any computer hardware described herein.

The virtualization environment 302 executing on the computing device 201 can be any virtualization environment described herein. In particular, the virtualization environment 302 can include the hypervisor configuration illustrated in FIG. 2A or the hypervisor configuration illustrated in FIG. 2B. In one embodiment, the hypervisor 202 included in the virtualization environment 302 can be any hypervisor 202, or any hypervisor 202 described herein. The hypervisor 202, in some embodiments, can be included in any hypervisor configuration such as those depicted in FIGS. 2A and 2B.

FIG. 3 illustrates a computing machine 302 that includes a virtualization environment 302 which includes a control virtual machine 232, such as any control virtual machine 232 described herein. The control virtual machine 232 executes a control program 220, such as any control program 220 described herein, and can include a virtual disk 226, such as any virtual disk 226 described herein. While FIG. 3 illustrates a virtualization environment 302 that includes a control virtual machine 232A and another virtual machine 232B, in some embodiments the virtualization environment 302 can include any number of virtual machines 232. The virtual machines 232 can execute a guest operating system 230, such as any guest operating system 230 described herein, and can include a virtual disk 226, such as any virtual disk 226 described herein.

In one embodiment, the virtual disk 226 included in each virtual machine 232 can further include or be associated with metadata 322A-B (generally referred to as metadata 322.) The virtual disk(s) 226 can include, store or otherwise be associated with the metadata 322. In some embodiments, the metadata 322 can be any form of metadata such as: electronic information; electronic files; tags; images; documents; text files; tables; lists; or any other form of electronic data that includes information. The metadata 322 can include information related to the virtual disk 226 such as the disk type, functionalities associated with the disk, compression schemes for the disk, or any other information related to the disk.

A VDI client 320 can be executed by the control virtual machine 232. In some embodiments, the VDI client 320 can be executed by any virtual machine, while in other embodiments the computing device 201 or the hypervisor 202 can execute the VDI client 320. The VDI client 320 can be a program or application that establishes a communication link with a VDI platform 310 executing on a remote computing device 203. Upon establishing a link with the VDI platform 310, the VDI client 320 can stream or download resources managed by the VDI platform 310, and can send the VDI platform 310 information about other virtual machines 232 such as virtual machine performance metrics or user activity data. In some embodiments, the VDI client 320 can communicate with the VDI platform 310 to receive virtual machine data. Using this virtual machine data, the VDI client 320 can instantiate, execute or otherwise generate a virtual machine from the virtual machine data.

In one embodiment, the VDI client 320 communicates with remote computers using a virtual channel. In other embodiments, the VDI client 320 can communicate with any client or any application executing on any remote computer using a virtual channel. The virtual channel, in some embodiments, can be a communication channel or any other communication link that uses the ICA protocol.

While FIG. 3 illustrates a VDI client 320, in some embodiments the virtualization environment 302 may not contain a VDI client 320. In one embodiment, the VDI client 320 can also communicate with a virtual machine manager 352. The virtual machine manager 352, in some embodiments, can be the XENSERVER application published by Citrix Systems. In another embodiment, the virtualization environment 302 may not include a VDI client 320, but rather may include a control program 220 that communicates with a virtual machine deployment application or virtual machine manager executing on a remote computer.

In some embodiments, the control virtual machine 232A or any other virtual machine 232 or application executing within the virtualization environment 302 can communicate with a performance monitoring system 316 to transmit virtual machine performance metrics for virtual machines 232 executing within the virtualization environment 302. In some embodiments, virtual machine performance metrics can include any of the following metrics: disk usage statistics; processor load statistics; bandwidth usage statistics; average load statistics; throughput statistics; statistics regarding the usage of computing resources at any one period of time; the amount of time it takes to perform a particular process; how long the virtual machine remained in use; the availability of computing system resources at any period in time; and any other relevant virtual machine performance metric. While in some embodiments the control virtual machine 232A communicates directly with the performance monitoring system 316, in other embodiments the control virtual machine 232A communicates indirectly with the performance monitoring system 316 through a virtual machine manager 352.

In other embodiments, the control virtual machine 232A or any other virtual machine 232 or application executing within the virtualization environment 302 can communicate directly or indirectly with a performance monitoring system 316 to transmit recorded user session information to the performance monitoring system 316. In some embodiments, a particular user can access one or more virtual machines 232 within a virtualization environment 302. The user can access systems resources available on the virtual machine(s), can use networks that interface with the virtual machine(s), or otherwise interact with the virtual machine(s). By interacting with the virtual machine(s), the user can in some embodiments generate user information, user data, user statistics or user performance information. This user information can be tied to a particular user or user session and can be obtained by intercepting information or data generated responsive to a user's actions within the context of the user session. User information can include: the volume of resources requested by the user during the user session 304; the amount of applications accessed by the user; the average amount of load resulting from user requests generated by the user during the user session 304; a user identifier; an amount of bandwidth required to meet the user's requests; and any other relevant user performance information.

In some embodiments, user session information can include a session record that records the start time and the end time of a user session. User session information transmitted to the performance monitoring system 316 can include a session record and in some embodiments can include any of the following information: time periods (e.g. date and time) that a user accessed or otherwise user; a user identifier of the user; and an identifier of the virtual machine accessed by the user.

When the virtual machine metrics are transmitted to the performance monitoring system 316, in some embodiments the metrics are recorded or stored according to the user that accessed the virtual machine. For example, when a user terminates a user session, the user session information and virtual machine metrics generated during that user session can be transmitted to the performance monitoring system 316. In some embodiments, the virtual machine metrics can be mapped onto the user session information in the sense that the virtual machine metrics can be stored along with an indicator that the metrics were generated during the session described by the user session information. Thus, if the virtual machine metrics are stored in a database, then the record containing the virtual machine metrics can include a field that identifies the user session during which the virtual machine metrics were generated. This field can include further information about the user or user session. In some instances, the field can point to another record or set of stored information that further describes the user session, the user, the user's workload profile, or the user's categorization. In some embodiments, the combined set of stored virtual machine information and session identifier can be referred to as a user workload profile.

In other embodiments, when virtual machine metrics are combined with user session information to either create a workload profile or generate a record of user-specific virtual machine metrics, the virtual machine metrics can be truncated or modified according to the user session information. For example, when user session information indicates that a user session lasted from a time A to a time B, any virtual machine metrics generated outside of the time period lasting from time A to time B are deleted. Similarly, if additional virtual machine metrics are identified as being generated during the time period lasting from time A to time B, these metrics are appended to the stored virtual machine metrics. A modification of the workload profile or record of user-specific virtual machine metrics can take place when the profile or record is generated, or at a later point in time. In some embodiments, the workload profile storage 322 (e.g. a performance database) can perform modifications on the workload records stored therein.

In one embodiment, the remote computing device 203 can execute a VDI platform 310. The Virtual Desktop Infrastructure (VDI) platform 310 can be any platform able to implement and manage a virtual desktop infrastructure. In one embodiment, the VDI platform 310 can communicate with other applications or programs executing on the computing device 203 and in some embodiments can communicate with a performance monitoring system 316. In other embodiments, the VDI platform 310 can communicate with a virtual machine manager 352.

The VDI platform 310 can be any platform provided by the XEN DESKTOP family of products manufactured by CITRIX SYSTEMS, INC. of Fort Lauderdale, Fla. In one embodiment, the VDI platform 310 can be a platform that establishes user sessions between users and the VDI platform 310. Although FIG. 3 illustrates the virtual machine pool outside of the VDI platform 310, in some embodiments the VDI platform 310 can access the virtual machines 232 of the virtual machine pool 312 and can allocate virtual machines 232 to user sessions. In other embodiments, the VDI platform 310 can allocate virtual desktops and other similar resources to user sessions. The VDI platform 310 can also manage the virtual resources allocated to the user sessions and can further perform load balancing functions to load balance the virtual resources amongst the user sessions based on a variety of criteria. In some embodiments the VDI platform 310 can be referred to as a virtual desktop infrastructure, a virtual desktop infrastructure environment or a virtual desktop infrastructure system.

The VDI platform 310, in some embodiments, can contain a virtual desktop broker 350. In some embodiments, the virtual desktop broker 350 can receive requests from a user for a virtual machine, and can respond to those requests by requesting a virtual machine from a pool of virtual machines 312. While FIG. 3 illustrates an embodiment where the virtual desktop broker 350 executes within a VDI platform 310, in other embodiments the VDI platform 310 may not include a virtual desktop broker 350. In those embodiments, the VDI platform 310 can carry out the functionality of the virtual desktop broker 350. For example, the VDI platform 310 can receive requests for virtual machines, and can responsively request a virtual machine for the user that issued the virtual machine request to the VDI platform 310. In one embodiment the VDI platform 310 can transmit the virtual machine to the user or the user session of the user, in other embodiments a virtual machine manager 352 can transmit the virtual machine to the user or the user session of the user.

In some embodiments, the VDI platform 310 can manage a pool or group of user sessions 314 (herein referred to generally as the user session pool 314.) This pool or group of user sessions 314 can include one or more user sessions 304 created between a user and the VDI platform 310. In some embodiments, a user session 304 can be generated when a user using a client computing device located remote from the computing device 203, requests a virtual desktop or a virtual machine, or requests access to a virtual desktop or a virtual machine. In other embodiments, a user session 304 can be created when a user logs onto a VDI platform 310 via a remote client computer. Still other embodiments include user sessions 304 that can be created when a user requests access to an application or resource available through a virtual machine or virtual desktop.

A user session 304, in some embodiments, can be a session between the computing device 203 and the user of the client machine, or a session between the VDI platform 310 and the user of the client machine. In one embodiment, the user session 304 can be created by the VDI platform 310 in response to a user request to log onto the VDI platform 310, a user request to access an application or resource, or a user request for a virtual machine or a virtual desktop. Users can access aspects of the VDI platform 310 from within a user session 304. Similarly, users can interact with a virtual machine 232 assigned to a user, within the user session 304.

The computing device 203 can store and/or execute a pool or group of virtual machines (herein referred to generally as the virtual machine pool 312.) This pool or group of virtual machines can include one, two or multiple virtual machines 232. In some embodiments, the virtual machines 232 can be virtual machine templates that, when streamed or downloaded into a virtualization environment 302, can be configured and executed to generate or instantiate a virtual machine 232. In other embodiments, the virtual machines 232 can be a collection of executable instructions, applications or other computing resources that, when streamed or downloaded into a virtualization environment 302, can be configured and executed to generate or instantiate a virtual machine 232. While FIG. 3 illustrates an embodiment where the virtual machine pool 312 exists independent of another application, in some embodiments the virtual machine pool 312 can be managed by the virtual machine manager 352. In still other embodiments, the virtual machine pool 312 can be stored and executed within the context of the virtual machine manager 352. In still other embodiments, the virtual machine pool 312 can be maintained on a remote computer. In some embodiments, the virtual machine pool 312 can be maintained by a virtual machine manager executing on a remote computer. For example, the virtual machine pool 312 can be maintained by the XENSERVER application executing on remote computer. In still other embodiments, the virtual machine pool 312 can be maintained by the VDI platform 310. In any of these embodiments, the VDI platform 310 can communicate with the application managing the virtual machine pool 312 and can request that the application make available a virtual machine within the virtual machine pool 312.

The computing device 203 can further execute a virtual machine manager 352. The virtual machine manager 352 can configure virtual machines and otherwise allocate virtual machines to users based on a set of criteria. In some embodiments, the virtual machine manager 352 can communicate with the performance monitoring system 316 to obtain a user workload profile, a user's categorization, virtual machine metrics, user session information, or other user or virtual machine metrics. The virtual machine manager 352 can use this information to determine how to configure a virtual machine, which virtual machine to allocate to a user or user session, or where to execute a virtual machine. The virtual machine manager 352, in some embodiments, can manage the pool of virtual machines 312. The virtual machine manager 352, in other embodiments, can be the XENSERVER application published by Citrix Systems. While FIG. 3 illustrates the virtual machine manager 352 executing on the same machine as the VDI platform 310 and the performance monitoring system 316, in other embodiments the virtual machine manager 352 can execute on a remote machine.

The virtual machine manager 352, in some embodiments, can allocate virtual machines to user sessions and users of a user session. Allocating a virtual machine to a user session or user can include generating a virtual machine or selecting a virtual machine. When allocation includes generating or configuring a virtual machine, the virtual machine manager 352 can create a virtual machine based on a user's requirements. These requirements can be communicated by a user, a user session, an administrator, a user profile, or any other set of virtual machine criteria. In some embodiments, the components of the virtual machine can by dynamically determined based on past user activity. In still other embodiments, the virtual machine can be configured or generated based at least in part on a categorization of the user, e.g. a categorization of a heavy, medium or light user. When allocation includes selecting a virtual machine, the virtual machine manager 352 can select a virtual machine from a pool of existing virtual machines. This selection can be made based on user or user session criteria, a user profile, a categorization of the user, or similar information.

In some embodiments, the computing device 203 can execute a performance monitoring system 316. The VDI platform 310, in some embodiments, can communicate with the performance monitoring system 316. In other embodiments, the performance monitoring system 316 can communicate with the VDI platform 310 through an application interface exposed by the VDI platform 310 or through an internal communication channel established between the VDI platform 310 and the performance monitoring system 316. The performance monitoring system 316, in one embodiment, executes outside of the VDI platform 310 such that the performance monitoring system 316 executes as a stand-alone application independent of the VDI platform 310. In other embodiments, performance monitoring system 316 can be included within the VDI platform 310. In still other embodiments, the VDI platform 310 and the performance monitoring system 316 can execute on separate computers such that the VDI platform 310 can execute on one computer and the performance monitoring system 316 can executed on a second computer remotely located from the first computer. In this embodiment, the VDI platform 310 can communicate with the performance monitoring system 316 over a network, via a virtual channel and/or via an application interface exposed by the VDI platform 310 and/or the performance monitoring system 316.

Virtual machine metric information and user session information can be shared between the VDI platform 310 and the performance monitoring system 316. In some embodiments, when the VDI platform 310 receives either user session information or virtual machine metrics recorded by a VDI agent 306, the VDI platform 310 can forward that information to the performance monitoring system 316. In other embodiments, the performance monitoring system 316 can interact with the VDI platform 310 through an application interface or communication channel, such that the performance monitoring system 316 substantially automatically receives any virtual machine metric information or user session information recorded by a VDI agent 306 and transmitted to the VDI platform 310. In still other embodiments, the VDI agent 306 can transmit the virtual machine metric information and user session information directly to the performance monitoring system 316 on the remote computer 203. In still other embodiments, the performance monitoring system 316 can receive user session performance information and/or virtual machine metric information directly from a virtualization environment 302.

The performance monitoring system 316 can include a virtual machine metrics storage repository 324 and a session record storage repository 330. In one embodiment, the virtual metrics storage repository 324 can be a database or other storage repository that stores virtual machine metrics. Virtual machine metrics 324 can be stored according to the virtual machine they correspond to, and in some embodiments, can also be stored according to the user that accessed the virtual machine, e.g. the virtual machine metrics can be stored against a particular user. The performance monitoring system 316 can further include a session record storage 330. In some embodiments, the session record storage 330 stores user session information. The user session information can be stored according to the user which the session information corresponds to. In other embodiments, the user session information can be stored according to the user and virtual machine which the session information corresponds to. While FIG. 3 illustrates a separate session record storage 330 and virtual machine metrics storage 324, in some embodiments both the user session information and virtual machine metrics are stored in the same repository.

In some embodiments, the performance monitoring system 316 can include a user workload profile storage 322. The user workload profile storage 322 can store user workloads generated from user session information and virtual machine metrics. In some embodiments, the user workload profile storage 322 can be a separate storage repository, while in other embodiments the user workload profile storage 322 can be combined with the session record storage 330 or the virtual machine metrics storage 324 into a single storage repository. In still other embodiments, the user workload profile storage 322 can store user workload profiles according to a corresponding user and/or virtual machine. A user workload profile can, in some embodiments, refer to a record of user-specific virtual machine metrics. These metrics can be virtual machine performance data associated with a particular user or user session. In some embodiments, the user workload profile can include a pointer to a particular user or user session. This pointer can be used to identify stored user information, user session information or user categorization information in another record, storage repository or database.

The performance monitoring system 316 can further include a virtual machine performance monitor 326 and a session monitor 332. In some embodiments, both the virtual machine performance monitor 326 and the session monitor 332 query the control program 220 in the virtualization environment 302 for virtual machine performance metrics and user session information. In other embodiments, the virtual machine performance monitor 326 and the session monitor 332 can obtain the virtual machine performance metrics and the user session information directly from the VDI platform 310. In still other embodiments, the virtual machine performance monitor 326 and the session monitor 332 can obtain the virtual machine performance metrics and the user session information from the VDI client 320 executing within the virtualization environment 302. While FIG. 3 illustrates a separate virtual machine performance monitor 326 and session monitor 332, in some embodiments the functions of each can be handled by a sign monitor. In some embodiments, the virtual machine performance monitor 326 can request and obtain virtual machine performance metrics. Upon receiving the virtual machine performance metrics, the virtual machine monitor 326 can store the received metrics in the virtual machine storage repository 324. The session monitor 332 can request and obtain user session information. Upon receiving the user session information, the session monitor 332 can store the received session information in the session record storage 330.

In some embodiments, the performance monitoring system 316 can include a categorization system 318 that can categorize users according to a user workload profile that can be stored in the user workload profile storage 322. The categorization system 318 can scan through user workload profile data and use the data to categorize users into one or more categories. These categories can be pre-defined or can be dynamically generated based on the user workload profile data stored in the user workload profile storage 322. For example, the categorization system 318 can categorize users as a 'light', 'medium' or 'heavy' user based on the workload profile for each user. A categorization can, in some embodiments, reflect the amount of resources consumed by each user. For example, a categorization can reflect the amount of disk storage, network bandwidth or CPU cycles typically used by a particular user. In one embodiment, attributing a categorization of 'light', 'medium' or 'heavy' can include determining a percentage or number of times a user's usage exceeded a predetermined threshold.

Figure 4:
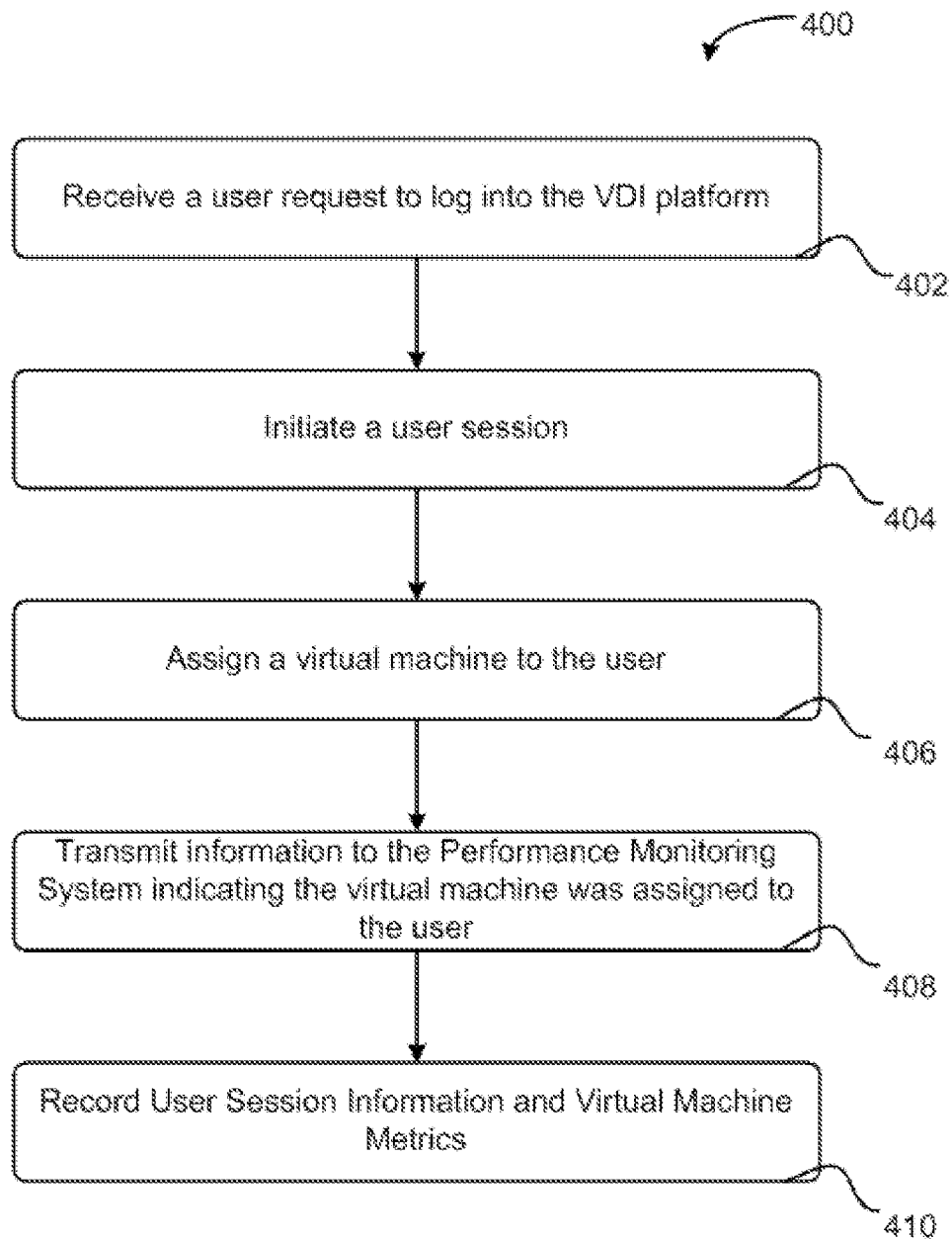
FIG. 4 is a flow diagram that depicts embodiments of methods for recording virtual machine utilization metrics.

Illustrated in FIG. 4 is one embodiment of a method 400 for recording virtual machine metrics, and associating these metrics with users. A VDI platform 310 or virtual desktop broker 350 can receive a user request to log into the VDI platform 310 (Step 402). In response, the VDI platform 310 can initiate a user session (Step 404) and a virtual machine manager 352 can assign a virtual machine to the user (Step 406). The VDI platform 310 can then transmit information to a performance monitoring system 316 indicating that a virtual machine was transmitted to the user (Step 408) and the performance monitoring system 316 can record virtual machine metrics against a user identifier (Step 410).

Further referring to FIG. 4, and in more detail, in some embodiments the method 400 can include receiving a user request to log into a VDI platform 310 (Step 402). In some embodiments, the user request is issued by a user using a remote client computer. The user request can be a request to log into the VDI platform 310 while in other embodiments the request can be a request for a virtual machine, a request for a desktop or a request to execute an application. In one embodiment, the VDI platform 310 intercepts the user request while in other embodiments the virtual desktop broker 350 intercepts the user request.

The VDI platform 310 or virtual desktop broker 350 can respond to receiving the user request by initiating a user session (Step 404). This user session, in some embodiments, can be associated with or otherwise representative of the user that issued the request. Thus, the user session information of the user session is information representative of a user's actions within the user session. In some embodiments the VDI platform 310 can start a new user session for the user, while in other embodiments the VDI platform 310 can re-start a cached user session associated with the user.

Upon initiating a user session, in some embodiments the VDI platform 310 can request a virtual machine manager 352 to allocate or assign a virtual machine to the user (Step 406). Allocating a virtual machine to the user can include streaming, downloading or otherwise transmitting a virtual machine to the user session of the user. The VDI platform 310, in some embodiments, transmits the request to allocate a virtual machine to the user upon receiving a user's request for a virtual machine. In other embodiments, the VDI platform 310 can transmit the request to allocate a virtual machine to the user upon initiating a user session.

Upon transmitting the virtual machine to the user session of the user, information can be transmitted to the performance monitoring system indicating the virtual machine was assigned to the user (Step 408). In some embodiments, the VDI platform 310 is also notified that a virtual machine was transmitted to the user session of the user. In still other embodiments, the method 400 may not include a step of notifying the performance monitoring system 316; rather the virtual machine manager 352 can manage obtaining user session information and virtual machine metrics for the performance monitoring system 316. Transmitting information to the performance monitoring system 316 or VDI platform 310 that indicates a virtual machine was transmitted to the user session can include transmitting an identifier of the virtual machine, characteristics of the virtual machine or other identifying information. The identifier can be a virtual machine ID, a virtual machine name, a virtual machine serial number or other identifier. The virtual machine characteristics can include the type and size of virtual disk included in the virtual machine, the operating system included in the virtual machine, the virtual CPU included in the virtual machine, the applications included on the virtual machine, and any other characteristics of the virtual machine transmitted to the user session of the user.

User session information generated by the user session initiated in response to the user request and virtual machine metrics for the virtual machine allocated to the user session, are recorded (Step 410). While the method 400 includes a step of recording user session information and virtual machine metrics, in some embodiments the step can include recording virtual machine metrics against a user identifier. In these embodiments, no user session information may be recorded. Rather, a user identifier may be recorded and used to store the virtual machine metrics against a particular user. In some embodiments, the virtual machine metrics can be recorded by any one of the control program 220, the VDI client 320 or an application executing within the virtual machine. The virtual machine metrics can be transmitted to any one of the VDI platform 310, the virtual machine manager 352 or the performance monitoring system 316 when a user session terminates. In other embodiments, the virtual machine metrics can be transmitted or streamed to any one of the VDI platform 310, the virtual machine manager 352 or the performance monitoring system 316 during the user session. Similarly, the user session information can be recorded by any one of the control program 220, the VDI client 320 or an application executing within the virtual machine. The user session information can be transmitted or streamed to any one of the VDI platform 310, the virtual machine manager 352 or the performance monitoring system 316 when a user session terminates or throughout execution of the user session. In embodiments where the user session and/or virtual machine metrics are streamed or transmitted to either the VDI platform 310 or the virtual machine manager 352, the information and metrics can be transmitted to the performance monitoring system 316 where they are ultimately stored and used to generate a user workload profile.

Figure 5A:
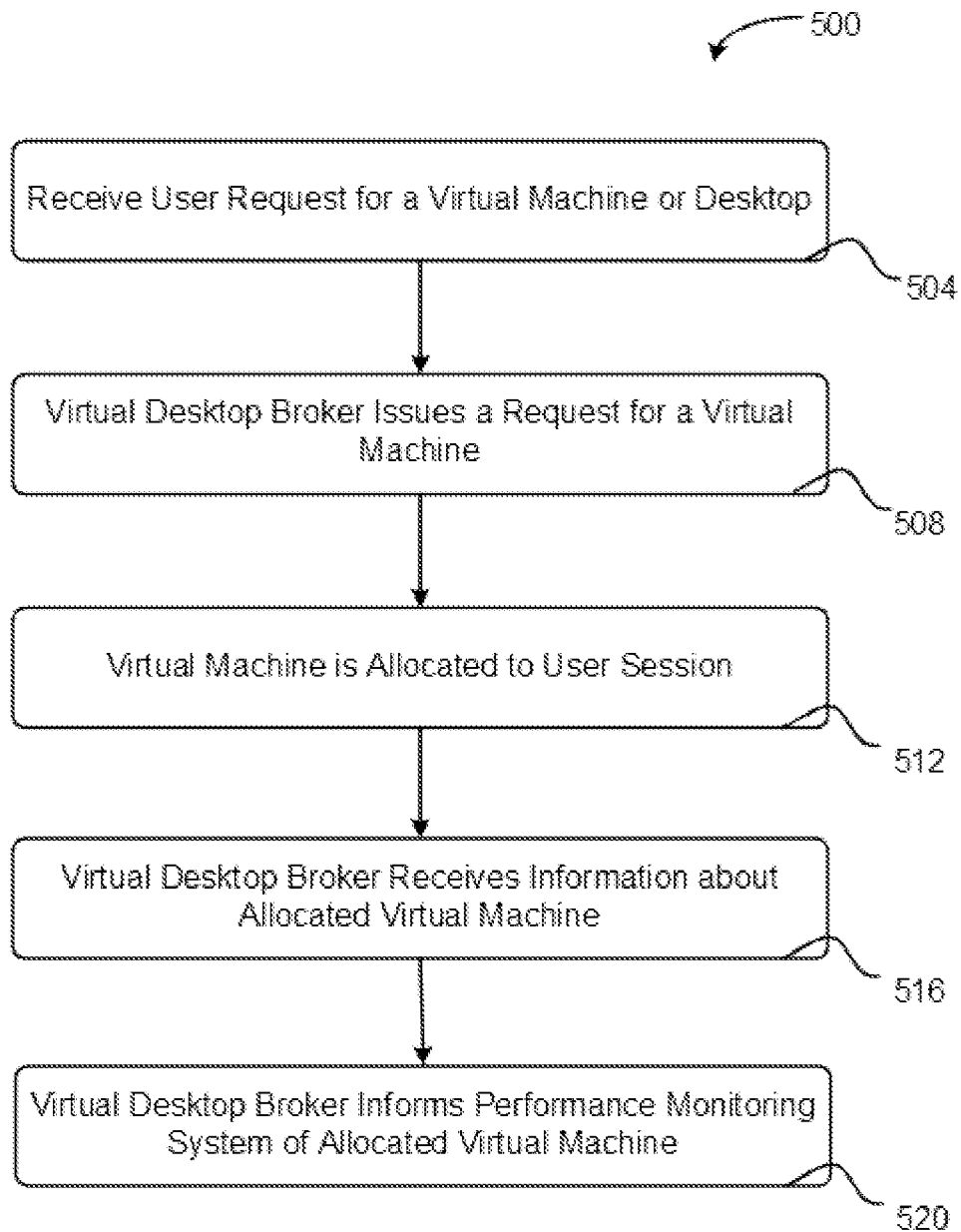
FIG. 5A and FIG. 5B are flow diagrams that depict embodiments of methods for allocating a virtual machine to a user.

Illustrated in FIG. 5A is one embodiment of a method 500 for allocating a virtual machine to a user or user session. A VDI platform 310 or virtual desktop broker 350 receives a user request for a virtual machine or desktop (Step 504) and the virtual desktop broker 350 responsively issues a request for a virtual machine (Step 508). A virtual machine is allocated to the user session of the user that issued the request (Step 512) and the virtual desktop broker 350 receives information about the allocated virtual machine (Step 516). The virtual desktop broker 350 then informs the performance monitoring system 316 about the allocated virtual machine (Step 520).

Further referring to FIG. 5A, and in more detail, in one embodiment the VDI platform 310 or the virtual desktop broker 350 receives a request for a virtual machine (Step 504). This request can be issued by a user, a user session or a client computer accessed by the user or executing the user session. In some embodiments, this request can cause the VDI platform 310 to authenticate the user and initiate a user session. In other embodiments, the user can issue the request for a virtual machine after initiation of a user session. In some embodiments, the request can include information such as: applications requested by the user; a user identifier; a name of the user; a user session identifier; a hardware configuration of the client computer used by the user to issue the request; the type of operating system or hypervisor executing on the client computer used by the user to issue the request; a preferred CPU configuration; or other such information.

Upon receiving the request, the VDI platform 310 or the virtual desktop broker 350 issues a request for a virtual machine (Step 508). This request can be issued directly to a virtual machine pool 312, or in some embodiments can be issued to a virtual machine manager 352. In some embodiments, the virtual desktop broker 350 can include information about the user, the user session, the initial user request, the client computer accessed by the user, or other such information with the request for a virtual machine. In other embodiments, upon receiving the virtual machine request from the virtual desktop broker 350, the virtual machine manager 350 can query the VDI platform 310 or virtual desktop broker 350 for information about the client computer used by the user, the user or the user session.

The virtual machine manager 352, in response to receiving the request, obtains information and allocates a virtual machine to the user session (Step 512). In some embodiments, the virtual machine manager 352 first obtains any one of the following from the performance monitoring system 316: a workload profile for the user that issued the request; or a categorization for the user that issued the request. The virtual machine manager 352 can obtain this information by passing a user identifier, e.g. user name or ID to the performance monitoring system 316. In turn, the performance monitoring system 316 can retrieve the user workload profile from the workload profile storage 322 using the user identifier, and can retrieve the user categorization from the categorization system 318 using the user identifier. In further embodiments, the virtual machine manager 352 can obtain information from the VDI platform 310 about the client computer used by the user or any particular configuration information identified by the user in the request. Using the information obtained from the performance monitoring system 316 and/or the VDI platform 310, the virtual machine manager 352 can generate and/or configure a virtual machine or select a virtual machine. In embodiments where the virtual machine manager 352 configures a virtual machine, the virtual machine manager 352 configures a virtual machine according to the obtained information and transmits or streams that virtual machine to the user session of the user. In embodiments where the virtual machine manager 352 selects a virtual machine, the virtual machine manager 352 retrieves information about the available virtual machines, selects a virtual machine that can handle the workload of the user, and can transmit that virtual machine to the user session of the user. For example, if the workload profile specifies that the user is a heavy user, then the virtual machine manager 352 can select a virtual machine that can accommodate a heavy user. In still other embodiments, the virtual machine manager 352 can select a virtual machine and further configure it according the user's specifications. Further embodiments of allocating a virtual machine to a user session (Step 512) are described in FIG. 5B.

Upon allocating the virtual machine to the user session, the virtual machine manager 352 can notify the virtual desktop broker 350 or VDI platform 310 about the virtual machine (Step 516). This notification can include a message indicating that a virtual machine was allocated to the user session of the user. In other embodiments, the notification can include an identifier for the allocated virtual machine. In still other embodiments, the notification can include a listing of the characteristics of the virtual machine. Yet other embodiments can include a notification that includes any combination of the above.

In some embodiments the method 500 can further include a step of informing the performance monitoring system of the allocated virtual machine (Step 520). In other embodiments, the method 500 may not include this step.

Figure 5B:
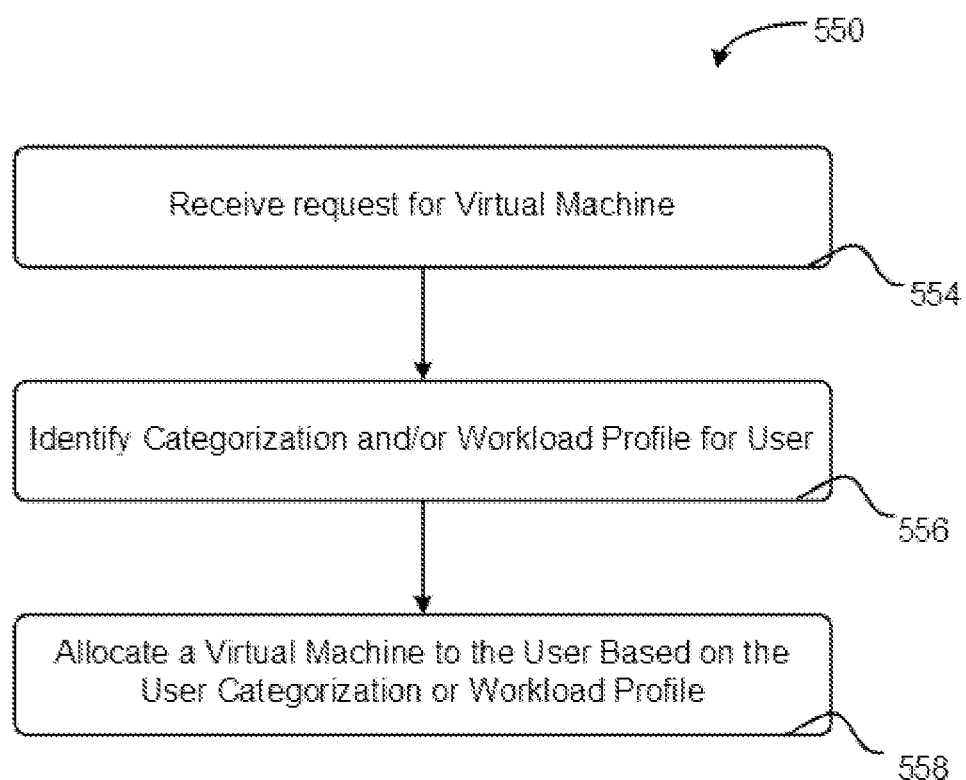

Illustrated in FIG. 5B is one embodiment of a method 550 for allocating a virtual machine to a user based on a user categorization or a user's workload profile. A virtual machine manager 352 can receive a request for a virtual machine (Step 554). Upon receiving this request, the virtual machine manager 352 can identify a user categorization or workload profile for the user requesting the virtual machine (Step 556) and based on the user categorization and/or workload profile, the virtual machine manager 352 can allocate a virtual machine to the user (Step 558).

Further referring to FIG. 5B, and in more detail, in some embodiments the method 550 can be carried out by a virtual machine manager 352. In other embodiments, the method 550 can be carried out by a VDI platform 310.

In some embodiments, a virtual machine manager 352 can receive a request for a virtual machine (Step 554). In other embodiments, a virtual machine pool can receive a request for a virtual machine. This request can be issued by a user or a user session and can include user identifying information, e.g. a user identifier. In still other embodiments, the request can be issued by a virtual desktop broker in response to receiving the request from a user session.

Upon receiving the request for a virtual machine, the virtual machine pool or virtual machine manager 352 can identify a user categorization and/or workload profile for the user (Step 556). In embodiments where the virtual machine manager 352 received a user identifier in the request, the virtual machine manager 352 can use the user identifier to obtain a user categorization and/or a workload profile for the user. In other embodiments, the virtual machine manager 352 can query the VDI platform 310 or the user session directly for an identifier of the user. Obtaining a user categorization or workload profile can include querying a performance monitoring system 316, a categorization system 318 or a user workload profile storage 322 for information associated with a particular user. By passing any one of the categorization system 318, the performance monitoring system 316 and/or the user workload profile storage 322 an identifier of the user, these entities can obtain information, e.g. records, associated with the user corresponding to the user identifier. For example, the performance monitoring system 316 can receive a user identifier of a user and can obtain a workload profile stored against that user identifier and/or a user categorization stored against that user identifier. Storing information against an identifier can include annotating or tagging the data with the user identifier or storing the user identifier along with the other information in the same record or as metadata. The obtained user workload profile and/or a user categorization can then be sent back to the virtual machine manager 352 or virtual machine pool. In other embodiments, the virtual machine manager 352 or virtual machine pool can retrieve the workload profile and/or user categorization.

Upon identifying a user categorization or workload profile for a user, the virtual machine manager 352 can allocate a virtual machine to the user (Step 558). Allocating a virtual machine to the user can include allocating a virtual machine to a user session of the user. In some embodiments a virtual machine manager 352 allocates a virtual machine to the user that issued the request, in other embodiments the VDI platform 310 can allocate a virtual machine to the user. In these embodiments, the virtual machine manager 352 can forward virtual machine information to the VDI platform 310 and the VDI platform 310 can transmit the virtual machine information to the user session of the user. Allocating a virtual machine to a user can include generating and configuring a new virtual machine then transmitting that virtual machine to a user session of the user. In other embodiments, allocating a virtual machine to a user can include selecting a virtual machine from a pool of existing virtual machine and then transmitting the selected virtual machine to a user session of the user. Selecting or generating and/or configuring a virtual machine can be done based on any set of user, computing device or virtual machine criteria.

In some embodiments, allocating the virtual machine to the user can be done based on a classification of the user. In these embodiments, the virtual machine manager 352 can use an obtained user classification to determine which virtual machine to allocate to a user. For example, if a user is a light user, a virtual machine appropriate for a light user can be allocated to a user or a user session of the user.

In other embodiments, allocating the virtual machine to the user can be accomplished based on an analysis of a workload profile of a user. Upon obtaining a user's workload profile, the virtual machine manager 352 can analyze the workload profile to determine whether the user is a light, medium or heavy user. When the user's categorization is determined, the virtual machine manager 352 can use the determined categorization to allocate an appropriate virtual machine to the user.

Figure 6:
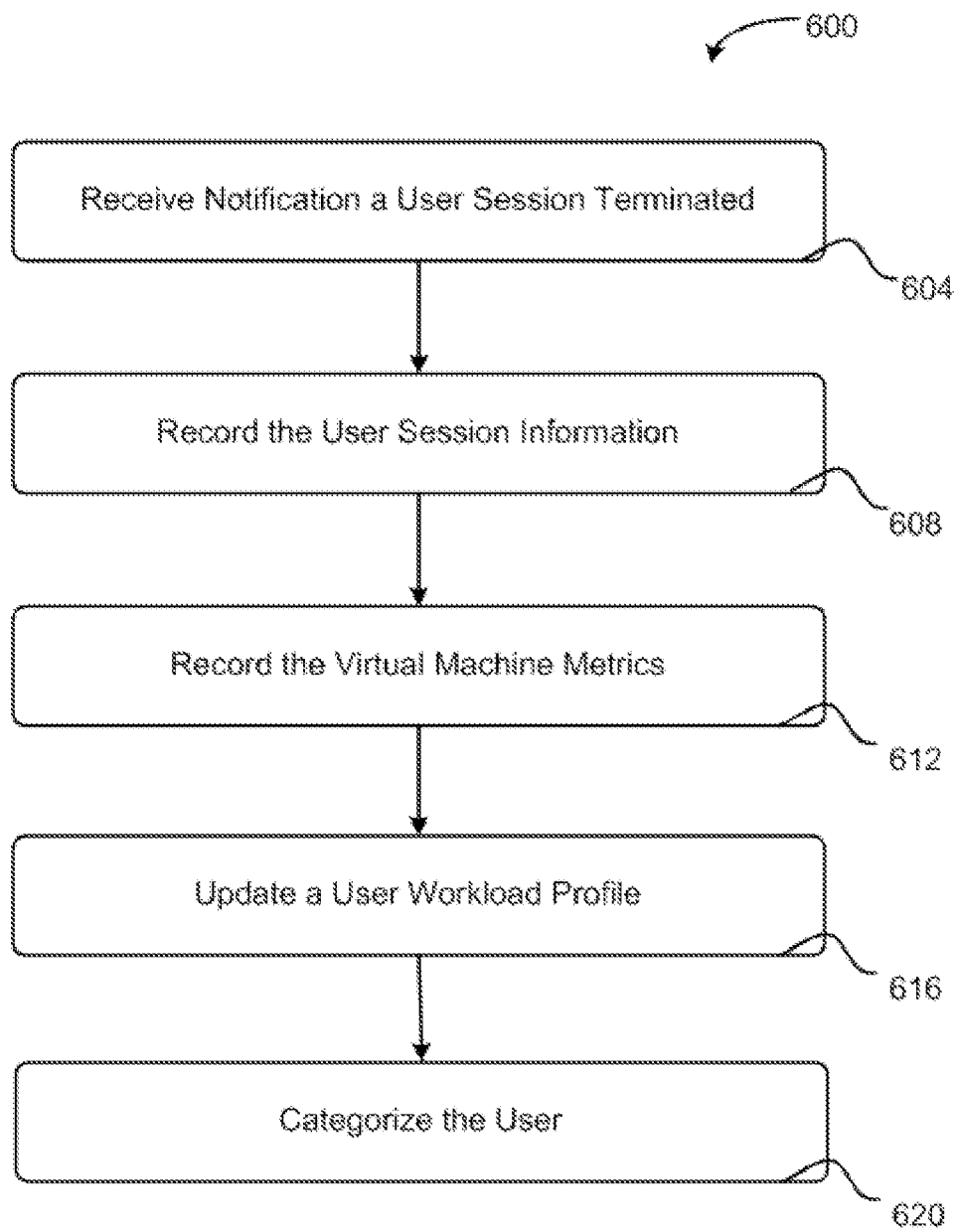
FIG. 6 is a flow diagram that depicts embodiments of updating a user workload profile.

Illustrated in FIG. 6 is one embodiment of a method 600 for categorizing a user and updating a workload profile. A performance monitoring system 316 can receive a notification that a user session terminated (Step 604) and responsively record user session information (Step 606) and virtual machine metrics (Step 608). The performance monitoring system 316 can then update a workload profile using the user session information (Step 612) and the virtual machine metrics (Step 616), and can categorize the user using the workload profile (Step 620).

Further referring to FIG. 6, and in more detail, in some embodiments a performance monitoring system 316 can receive a notification that a user session terminated (Step 604). In some embodiments, the performance monitoring system 316 can receive the notification from a virtual machine manager 352, while in other embodiments the performance monitoring system 316 can receive the notification from a VDI platform 310. The notification, in some embodiments, can include a user session identifier, a user identifier and/or a virtual machine identifier. The performance monitoring system 316 can use these identifiers to identify, store and later retrieve information associated with the user, e.g. a user identifier and/or virtual machine metrics. In some embodiments, applications executing within the performance monitoring system 316 can receive the notification. For example, in one embodiment a session monitor 332 receives the notification that a user session terminated either from the performance monitoring system 316 or directly from a VDI platform 310 or virtual machine manager 352. In still other embodiments, the notification can be sent by the user session upon termination directly to the session monitor 332 of the performance monitoring system 316.

The session monitor 332, in response to receiving the notification that a user session terminated, then records user session information for the terminated session (Step 608). Recording the user session information can include obtaining the user session information from any one of the following sources: the virtual machine manager 352; the VDI platform 310; the VDI client 320; or from a storage repository on the client computer used by the user of the terminated user session. In some embodiments, the user session information can be streamed to the performance monitoring system 316 during execution of the user session. In these embodiments, recording the user session information can include retrieving the user session information from a temporary storage location and storing it in a session record storage 330, or closing out a record in the session record storage 330. In many embodiments, recording the user session information can include storing the user session information in a user session record storage 330 along with an identifying mark that indicates the user session information is from a user session of the user identified in the termination notification. While in one embodiment the session monitor 332 records the user session information, in other embodiments the performance monitoring system 316 or another application executing within the context of the performance monitoring system 316 records the user session information.

The performance monitoring system 316 can then record virtual machine metrics (Step 612). Virtual machine metrics are metrics or performance data for a virtual machine accessed by the user during a user session, e.g. the terminated user session. These metrics can include any machine metrics or performance data described herein. In some embodiments the performance monitoring system 316 or any application executing within the context of the performance monitoring system 316 can record the virtual machine metrics. In other embodiments, a virtual machine performance monitor 326 can store the virtual machine metrics. Storing the virtual machine metrics can include obtaining the virtual machine metrics from any one of the following sources: the virtual machine manager 352; the VDI platform 310; the VDI client 320; or from a storage repository on the client computer used by the user of the terminated user session. In some embodiments, the virtual machine metrics can be streamed to the performance monitoring system 316 during execution of the user session. In these embodiments, recording the virtual machine metrics can include retrieving the virtual machine metrics from a temporary storage location and storing them in a virtual machine metrics storage 324, or closing out a record in the virtual machine metrics storage 324. In many embodiments, recording the virtual machine metrics can include storing the virtual machine metrics in a virtual machine metrics storage 324 along with an identifying mark that indicates the virtual machine metrics were generated during a user session of the user identified in the termination notification. The user and/or user session can further correspond to a virtual machine identified in the termination notification such that the user accessed the virtual machine during the user session.

In some embodiments, the performance monitoring system 316 can use the recorded user session information and virtual machine metrics to update a user workload profile for the user of the terminated user session (Step 616). Updating the user workload profile can include storing virtual machine metrics generated during a user session and mapping those virtual machine metrics to the user of the user session. Mapping the virtual machine metrics to a user can include annotating or otherwise associating a user identifier with the virtual machine metrics. In other embodiments, mapping the virtual machine metrics to a user can include associating the virtual machine metrics with a user session record. In some embodiments, the performance monitoring system 316 uses a user identifier included in the termination notification to obtain a user workload profile from the user workload profile storage 322. Upon obtaining the user workload profile that corresponds to the user of the terminated user session, the performance monitoring system 316 can then update the obtained user workload profile with the recorded virtual machine metrics. In some embodiments, the performance monitoring system 316 can then store the updated user workload profile in the user workload profile storage repository 322. In other embodiments, the performance monitoring system 316 can store the updated user workload profile after the user is categorized by the categorization system 318. In one embodiment, the process of updating the user workload profile can be carried out by the categorization system 318.

A categorization system 318 executing within the context of the performance monitoring system 316 can categorize a user using the updated workload profile (Step 620). In some embodiments, once the user workload profile is updated, the categorization system 318 receives a notification that the user may be categorized. A user may already be categorized, thus categorizing the user can include updating a user categorization with a new categorization that reflects the recorded virtual machine metrics. User categorizations can be any value representative of the amount of resources used by a user during a user session. In some embodiments, these values can be a light, medium and heavy user, where a light user uses very few resources and a heavy user uses a significant amount of resources. Resources can include computing cycles, memory usage, and any other computing resources accessed by a user. Determinations as to whether a user is a light, medium or heavy user can be made based on a set of threshold values specified by an administrator, or a set of threshold values empirically determined based on historical data. Categorizing the user can include reviewing the user workload profile of the user of the terminated user session, assigning a categorization to the user and storing that categorization in a storage repository.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for allocating a virtual machine according to a user categorization, where the user is categorized according to historical first user session information and virtual machine metrics, the method comprising:
 receiving, by a session monitor executing on a computing machine, notification a first user session terminated, the first user session accessing a first virtual machine;
 recording, by the session monitor responsive to termination of the first user session, first user session information;
 obtaining first virtual machine performance metrics for the first virtual machine from a virtual machine performance monitor, the first virtual machine performance metrics quantifying a load the first virtual machine places on a computing device executing the first virtual machine during the first user session;
 updating, by the performance monitor using the first user session information and the first virtual machine performance metrics, a first user workload profile;
 categorizing a first user corresponding to the first user session according to the first user workload profile;
 receiving, by a virtual desktop infrastructure, a request from the first user for a virtual machine; and
 allocating, responsive to receiving the request, a virtual machine to the first user according to the first user categorization.

2. The method of claim 1, wherein receiving a notification further comprises receiving by the session monitor executing outside of a virtual desktop infrastructure.

3. The method of claim 1, wherein categorizing further comprises categorizing the first user as one of a heavy user, a medium user and a light user according to the first user workload profile.

4. The method of claim 1, wherein updating the first user workload profile further comprises mapping the recorded first user session information onto the obtained first virtual machine metrics.

5. The method of claim 1, further comprising storing the first user categorization in a storage repository.

6. The method of claim 1, wherein categorizing further comprises categorizing by a categorization module executing on the computing machine outside of a virtual desktop infrastructure.

7. The method of claim 1, further comprising:
 receiving a notification a second user session terminated, the second user session accessing a second virtual machine;
 recording second user session information;
 obtaining second virtual machine performance metrics for the second virtual machine; and
 updating a second user workload profile using the second user session information and the second virtual machine performance metrics.

8. The method of claim 7, further comprising categorizing a second user corresponding to the second user session according to the second user workload profile.

9. The method of claim 1, wherein allocating a virtual machine to the first user further comprises requesting, by the virtual desktop infrastructure, a virtual machine from a virtual machine manager, the virtual machine manager allocating a virtual machine according to the first user categorization.

10. The method of claim 1, wherein allocating a virtual machine further comprises configuring a virtual machine according to the first user categorization.

11. The method of claim 1, wherein allocating a virtual machine further comprises selecting a virtual machine according to the first user categorization.

12. A system for allocating a virtual machine according to a user categorization, where the user is categorized according to historical first user session information and virtual machine metrics, the system comprising:
 a session monitor executing on a computing machine comprising a processor configured to:
  receive notification a first user session terminated, the first user session accessing a first virtual machine,
  record, responsive to termination of the first user session, first user session information, and
  obtain first virtual machine performance metrics for the first virtual machine from a virtual machine performance monitor, the first virtual machine performance metrics quantifying a load the first virtual machine places on a computing device executing the first virtual machine during the first user session;
 the performance monitor:
  updating a first user workload profile using the first user session information and the first virtual machine performance metrics,
  wherein a first user corresponding to the first user session is categorized according to the first user workload profile; and
 a virtual desktop infrastructure executing on a computing machine comprising a processor configured to:
  receive a request from the first user for a virtual machine, and
  allocate, responsive to receiving the request, a virtual machine to the first user according to the first user categorization.

13. The system of claim 12, wherein the session monitor executes outside of a virtual desktop infrastructure.

14. The system of claim 12, wherein the first user is categorized as one of a heavy user, a medium user and a light user according to the first user workload profile.

15. The system of claim 12, wherein the performance monitor further maps the recorded first user session information onto the obtained first virtual machine performance metrics.

16. The system of claim 12, further comprising a storage repository for storing the first user categorization.

17. The system of claim 12, further comprising a categorization module executing on the computing machine outside of a virtual desktop infrastructure, wherein the categorization module categorizes the first user.

18. The system of claim 12, wherein:
the session monitor is further configured to:
receive a notification a second user session terminated, the second user session accessing a second virtual machine,
record second user session information, and
obtain virtual machine performance metrics for the second virtual machine; and
the performance monitor is further configured to update a second user workload profile using the second user session information and the second virtual machine metrics.

19. The system of claim 18, further comprising a categorization module categorizing a second user corresponding to the second user session according to the second user workload profile.

20. The system of claim 12, wherein the virtual desktop infrastructure allocates the virtual machine to the first user by requesting a virtual machine from a virtual machine manager, and the virtual machine manager allocates a virtual machine to the first user according to the first user categorization.

21. The system of claim 20, wherein the virtual machine manager allocates the virtual machine to the first user by configuring a virtual machine according to the first user categorization.

22. The system of claim 20, wherein the virtual machine manager allocates the virtual machine to the first user by selecting a virtual machine according to the first user categorization.

* * * * *